United States Patent [19]

Salzmann et al.

[11] 4,074,348
[45] Feb. 14, 1978

[54] CIRCUIT ARRANGEMENT WITH A NUMBER OF CYCLOCONVERTERS, PARTICULARLY DIRECT CYCLOCONVERTERS IN Y-CONNECTION

[75] Inventors: Theodor Salzmann; Wolfgang Timpe, both of Erlangen; Manfred Weibelzahl, Weiher, all of Germany

[73] Assignee: Siemens Aktiengesellschaft, Munich, Germany

[21] Appl. No.: 663,131

[22] Filed: Mar. 2, 1976

[30] Foreign Application Priority Data

Mar. 3, 1975  Germany .............................. 2509177

[51] Int. Cl.² ............................................. H02M 5/27
[52] U.S. Cl. ................................................. 363/160
[58] Field of Search ...................... 318/227; 321/69 R; 363/159, 160, 161

[56] References Cited

U.S. PATENT DOCUMENTS

| 3,942,091 | 3/1976 | Weibelzahl | 321/69 R |
| 3,970,914 | 7/1976 | Salzmann et al. | 318/227 X |

*Primary Examiner*—William M. Shoop
*Attorney, Agent, or Firm*—Kenyon & Kenyon, Reilly, Carr & Chapin

[57] ABSTRACT

A circuit arrangement is disclosed comprising a converter for converting a three-phase system of sinusoidal voltages into three trapezoidal control voltages for controlling control units serving three direct cycloconverters. More particularly, in accord with the invention, the converter acts on the sinusoidal control voltages such that during each region from $\pi/3$ to $2\pi/3$ of a half-wave of each particular voltage that voltage is reduced to $\sqrt{3}/2$ times its peak value, while the other two voltages are amplified or increased by an amount equal to the difference between the aforesaid peak value and $\sqrt{3}/2$ times such peak value.

3 Claims, 3 Drawing Figures ns type. Also, its windings may be delta or Y-connected.

As shown, the cycloconverters 1, 2, 3 are direct cycloconverters. Each cycloconverter comprises two antiparallel sub-rectifiers with controlled valves, shown as thyristors, in a three-phase bridge circuit. Associated with the cycloconverters 1, 2, 3, are the linear control units 7, 8, 9, respectively. These control units supply the controlled valves of the cycloconverters with firing pulses of predetermined control angle and fixed sequence, in dependence on periodic control voltages $U^*_{S1}$, $U^*_{S2}$, $U^*_{S3}$. The control units 7, 8, 9 are each parts of control circuits of the type described, for example, in German Patent application No. 2,502,513.

A command stage 22 is supplied with the actual current values $I_1$, $I_2$ associated with the control units 7, 8, 9. These actual current values can be supplied by current transformers 35 and 36. For each control unit 7, 8, 9, the command stage 22 forms a signal which indicates which of the two sub-rectifiers being fed by the control unit should receive control pulses. In forming the signal for the third control current, the condition that the sum of all phase currents $I_1 + I_2 + I_3$ is zero is utilized. In particular, if the actual current values $I_1$ and $I_2$ are known, the sign of the phase current $I_3$ can be obtained therefrom automatically.

The circuit of FIG. 1 is further provided with a control or regulating device 34 which supplies three sinusoidal output voltages $U'_1$, $U'_2$, $U'_3$ of periodic waveform. The control or regulating device 34 may be a control circuit which operates according to the principle of field-oriented control ("Siemens Zeitschrift" 45, 1971, pages 757 to 760) and is supplied by the two current transformers 35 and 36 with the actual values of the phase currents $I_1$ and $I_2$. Assuming the control units 7, 8, 9 to be linear, the three output voltages furnished by the control or regulating device 34 in steady-state operation are sinusoidal and are each displaced 120° el relative to each other. If other conventional control circuits are to be used for the control or regulating device 34, they should be designed so that their output voltages can be described by the function $c \cdot \sin^{-1}(k \cdot \sin wt)$, where $t$ is the time, $w$ the angular frequency and $c$ and $k$ constants.

The output voltages $U'_1$, $U'_2$, $U'_3$ of the control or regulating device 34 are fed to a converter stage 71 which forms the control voltages $U^*_{S1}$, $U^*_{S2}$, $U^*_{S3}$ therefrom.

As can be seen from FIG. 2, the waveforms of the output voltages $U'_1$, $U'_2$, $U'_3$ of the control or regulating device 34 are sinusoidal. The waveforms of the control voltage $U'_{S1}$, $U'_{S2}$, $U'_{S3}$ formed therefrom however, indicate that the control voltages are reduced in each region from $\pi/3$ to $2\pi/3$ of their half-waves to $\sqrt{3}/2$-times their peak values and increased in each of the remaining outer regions of their half-waves by an amount equal to the difference between their peak values and $\sqrt{3}/2$ times their peak values. The voltages $U'_{S1}$, $U'_{S2}$, $U'_{S3}$ thus each have a trapezoidal waveform. By means of subsequent linear amplifiers (not shown), the amplitude of the voltages $U'_{S1}$, $U'_{S2}$, $U'_{S3}$ can be adjusted to any desired magnitude and fed as the control voltages $U^*_{S1}$, $U^*_{S2}$, $U^*_{S3}$ to the control units 7, 8, 9. It is particularly advantageous to increase or amplify the voltages $U'_{S1}$, $U'_{S2}$, $U'_{S3}$ by the factor $2/\sqrt{3}$, so that then the control voltages $U^*_{S1}$, $U^*_{S2}$, $U^*_{S3}$ have the same amplitude as the output voltages $U'_1$, $U'_2$, $U'_3$.

FIG. 3 shows schematically the basic internal circuit structure of the converter stage 71. As illustrated, con-

CIRCUIT ARRANGEMENT WITH A NUMBER OF CYCLOCONVERTERS, PARTICULARLY DIRECT CYCLOCONVERTERS IN Y-CONNECTION

BACKGROUND OF THE INVENTION

1. Field of the Invention

The invention relates to a circuit arrangement comprising an odd number of cycloconverters and, in particular, an odd number of direct cycloconverters supplied from an AC network.

2. Description of the Prior Art

In one circuit arrangement of the above type, the converters are arranged in a symmetrical $m$-phase Y-connection and are connected to a symmetrical $m$-phase load, omitting a direct connection between the Y-point of the converters and the Y-point of the load. The phase voltages at the load each have a predetermined periodic waveform and together form a symmetrical system. The control units of the $m$ cycloconverters are fed by a control or regulating device which supplies $m$ output voltages of periodic waveform. These output voltages are such that the output voltage of each cycloconverter includes a periodic waveform which contains the waveform of a voltage which corresponds to a given phase voltage at the load and also the waveform of at least one harmonic of uneven order divisible by $m$.

The object of the present invention is to improve the power factor on the network side in the above-described circuit arrangement.

SUMMARY OF THE INVENTION

In accordance with the principles of the present invention, the above and other objectives are accomplished in the above-described circuit arrangement by including therein a converter stage between the control units and the regulating device. More particularly, the converter stage acts upon the output voltages of the regulating device such that during each region from $\pi/3$ to $\pi/3$ of a half-wave of each particular voltage that voltage is reduced to $\sqrt{3}/2$ times its peak value, while the other two voltages are increased by an amount equal to the difference between the aforesaid peak value and $\sqrt{3}/2$ times such peak value.

By designing the circuit arrangement in the above manner, the power requirements of the cycloconverter installations can be reduced. This means that the transformers as well as the cycloconverters of the installations can be designed for less power.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
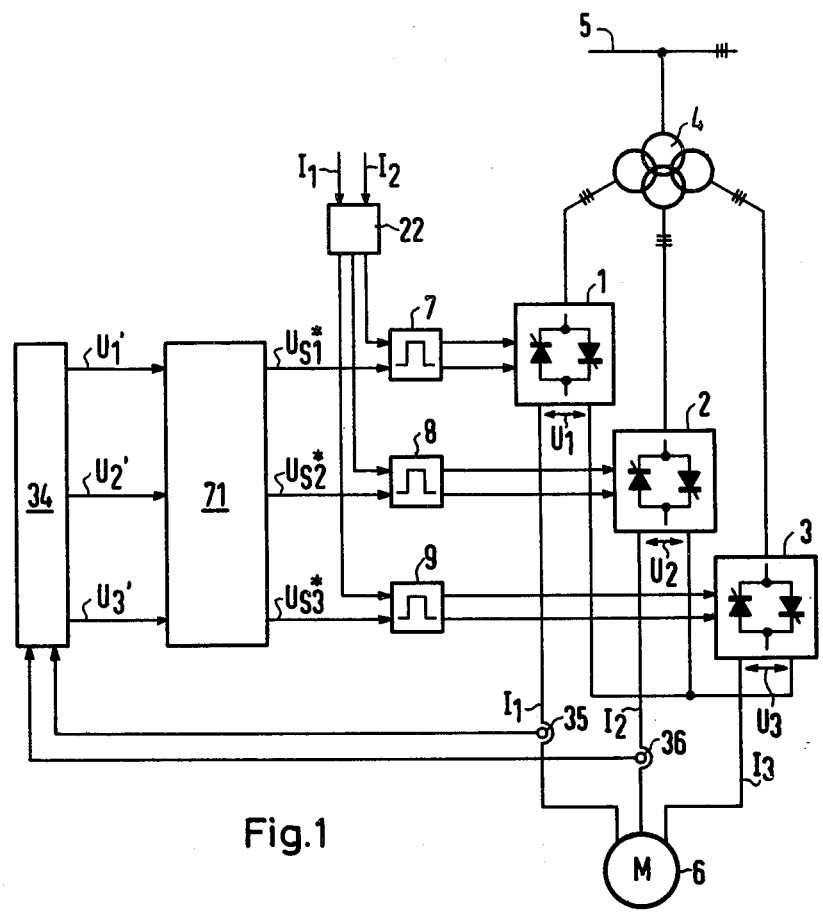
FIG. 1 shows a circuit arrangement in accordance with the principles of the present invention.

FIG. 1 shows a circuit arrangement comprising three cycloconverters 1, 2, 3. The converters 1, 2, 3 are connected to a three-phase AC network 5 via a transformer 4 and also to a load 6. The load 6 may preferably be a rotating-field machine of the synchronous or asynchroverter stage 71 includes three channels, each of which corresponds to one of the three phases. In particular, these channels include summing amplifiers 84, 86 and 88, limiter stages 85, 87 and 89 and differential amplifiers 90, 91 and 92, respectively. The summing amplifiers 84, 86, 88 are fed as input signals the output voltage $U'_1$, $U'_2$, $U'_3$, respectively. Additionally, each summing amplifier of a channel receives as input signals the output signals of the differential amplifiers of the other two channels. The output signals of the summing amplifiers 84, 86, 88, in turn, are limited in the limiter stages 85, 87, 89 to positive and negative limit values $B^+$, $B^-$. These limited signals and their corresponding unlimited signals are then fed to the respective differential amplifiers 90, 91, 92. If it is desired to avoid connecting the inputs of the limiting stages to the differential amplifiers, an additional summing amplifier can be provided for each channel. Each additional summing amplifier would have its output coupled to the differential amplifier of its respective channel and receive as its inputs the control voltage associated with its respective channel and the outputs of the differential amplifiers of the other two channels.

The output voltages $U'_{S1}$, $U'_{S2}$, $U'_{S3}$ developed by the limiter stages 85, 87, 89 and then fed to the linear amplifiers 76, 77 and 78, respectively, where they are amplified by a proportionality factor, preferably the factor $2/\sqrt{3}$. The amplified voltages represent the control voltages $U^*_{S1}$, $U^*_{S2}$, $U^*_{S3}$.

Figure 2:
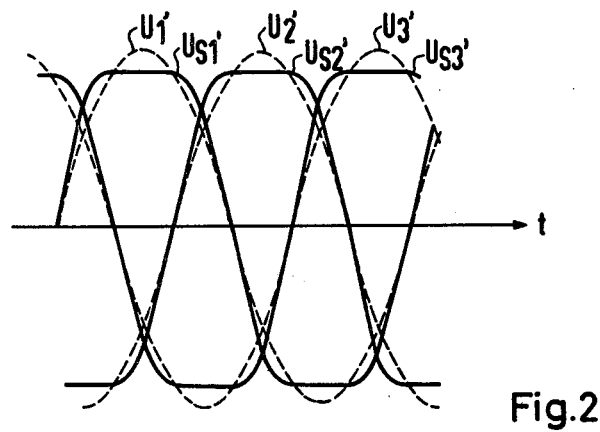
FIG. 2 shows waveform diagrams for explaining the operation of the circuit arrangement of FIG. 1.
Figure 3:
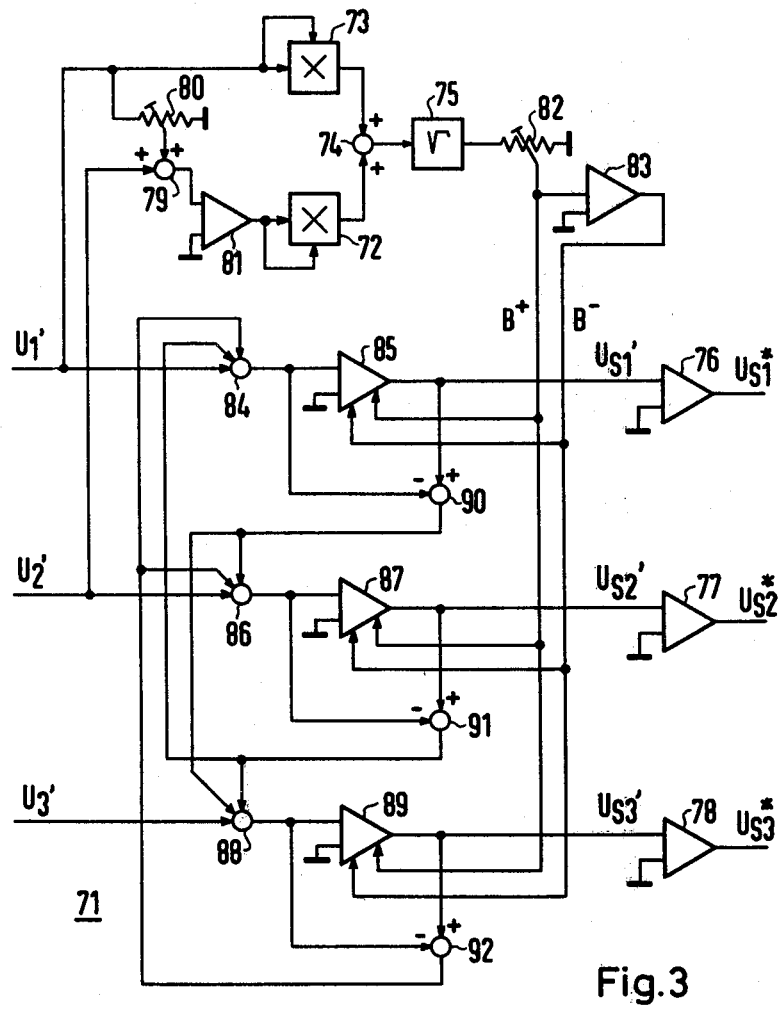
FIG. 3 shows the converter stage of FIG. 1 in greater detail.

The operation of the converter 71 will be explained by making reference to the first channel comprising summing amplifier 84, limiter stage 85, differential amplifier 90 the linear amplifier 76. In the summing amplifier 84, the sinusoidal output control voltage $U'_1$ is added to the output signals of the differential amplifiers of the other two channels. The output signal of the summing amplifier 84 is limited in the limiter stage 85 to the limit values $B^+$ and $B^-$. The differential amplifier 90 forms the difference between the output signal and the input signal of the limiter stage 85. This difference signal is produced only if the output voltage of the limiter stage has gone into saturation. As will be seen from the diagram of FIG. 2, the differential amplifier 90, for example, will furnish a difference signal only in the region between $\pi/3$ and $2\pi/3$. This difference signal is added in the summing amplifiers 86 and 88 in the other two channels to the respective sinusoidal output control voltages $U'_2$ and $U'_3$. These two output voltages are thus amplified in their outer regions from 0 to $\pi/3$ and from $2\pi/3$ to $\pi$ of a halfwave by the respective difference signal.

The limit values $B^+$, $B^-$ for the limiter stages 85, 87, 89 are formed in a computer circuit. This computer circuit contains a first adding stage 79 which is fed the output voltage $U'_2$ and the output voltage $U'_1$, the latter voltage having first been halved by a first voltage divider 80. A linear amplifier 81 multiplies the output voltage of the first adding stage 79 by the factor $2/\sqrt{3}$. The output voltage of the second voltage divider 81 is squared in a squaring stage 72. A second squaring stage 73 is fed the output voltage $U'_1$. A second adding stage 74 forms the sum of the output voltages of the two squaring stages 72 and 73. This sum voltage is fed to a root-taking stage 75, the output voltage of which is multiplied in a third voltage divider 82 by the factor $\sqrt{3}/2$. The output voltage of the second voltage divider 82 represents the positive limit value $B^+$. This positive limit value $B^+$ is fed to an inverting amplifier, the output signal of which represents the negative limit value $B^-$.

The particular advantage of the aforesaid computer circuit is that the limit values $B^+$ and $B^-$ for the limiter stages 85, 87, 89 are adjusted without delay to $\sqrt{3}/2$ times the positive or negative peak value of the amplitude of the respective output voltages $U'_1$, $U'_2$, $U'_3$. The aforesaid three output voltages represent a symmetrical three-phase system and can, therefore, be considered as three coordinates of a revolving voltage vector U, displaced by 120°, the magnitude of which corresponds to the amplitude of the three voltages. The magnitude of the voltage vector $\overline{U}$ is obtained from the instantaneous values of two output voltages, e.g., $U'_1$ and $U'_2$ according to Eq. (1) below and corresponds at any instant to the amplitudes expected for the three output voltages:

$$|\overline{U}| = \sqrt{U'^2_1 + [2(U'_2 + U'_1/2)/\sqrt{3}]^2} \quad (1)$$

Equation (1) is simulated in the computer circuit by the members 72 to 75 and 79 to 83.

What is claimed is:

1. A circuit arrangement comprising:
    an odd number $m$ of Y-connected cycloconverters adapted to be connected to an AC network and to a symmetrical m-phase load without a direct connection between the Y-point of said cycloconverters and the Y-point of said load, said load having phase voltages of a predetermined periodic waveform and together forming a symmetrical system;
    a number of control units for supplying control voltages to said cycloconverters such that each converter has an output voltage which is a periodic waveform comprised of a waveform corresponding to a predetermined one of said phase voltages and of a waveform of at least one harmonic of an odd order divisible by $m$;
    a regulating device for generating $m$ output voltages of periodic waveform;
    and a converter stage for converting said output voltages and including means for supplying said converted output voltages to said control units, said converter stage converting said output voltages such that during each region from $\pi/3$ to $2\pi/3$ of a half wave of each particular output voltage that output voltage is reduced to $\sqrt{3}/2$ times its peak value and the other two output voltages are increased by an amount equal to the difference between said peak value and $\sqrt{3}/2$ times said peak value.

2. A circuit arrangement in accordance with claim 1 in which said converter stage includes $m$ channels each associated with a different one of said output voltages and each including:
    a limiter stage having an input and output, said limiter stage providing one of said converted output voltages at said output such that said one converted output voltage has positive and negative portions which are within respective positive and negative limit values;
    a differential amplifier responsive to said input and output of said limiter stage; and
    a summing amplifier having an output connected to said input of said limiter stage and being responsive to the output voltage associated with its channel and to the outputs of the differential amplifiers associated with the other channels.

3. A circuit arrangement in accordance with claim 2 which further includes a computer stage for forming said limit values, said computer stage comprising:
- a first voltage divider for providing an output equal to half that of one of said output voltages;
- a first adder for adding the output of said first voltage divider and a second one of said output voltages;
- a linear amplifier for generating an output equal to $2/\sqrt{3}$ times the output of said first adding stage;
- a first squaring stage for forming the square of the output of said linear amplifier;
- a second squaring stage for forming the square of said first one of said output voltages;
- a second adding stage for adding the outputs of said first and second squaring stages;
- a root-taking stage for forming the square root of the output of said second adding stage;
- a second voltage divider for forming an output equal to $\sqrt{3}/2$ times the output of said root-taking stage, said output of said second voltage divider forming said positive limit value;
- and an inverting stage for inverting the output of said second voltage divider to form said negative limit value.

* * * * *